(12) United States Patent
Takama

(10) Patent No.: US 11,189,041 B2
(45) Date of Patent: Nov. 30, 2021

(54) IMAGE PROCESSING APPARATUS, CONTROL METHOD OF IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Yasufumi Takama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/396,870

(22) Filed: Apr. 29, 2019

(65) Prior Publication Data

US 2019/0340777 A1 Nov. 7, 2019

(30) Foreign Application Priority Data

May 7, 2018 (JP) .............................. JP2018-089465

(51) Int. Cl.
*G06T 7/55* (2017.01)
*G06T 7/70* (2017.01)
(Continued)

(52) U.S. Cl.
CPC .................. *G06T 7/55* (2017.01); *G06T 7/70* (2017.01); *G06T 15/08* (2013.01); *H04N 5/247* (2013.01);
(Continued)

(58) Field of Classification Search
CPC .. G06T 15/08; G06T 7/55; G06T 7/70; G06T 2200/04; G06T 2207/30228; G06T 2207/30221; H04N 5/247
See application file for complete search history.

(56) References Cited

U.S. PATENT DOCUMENTS 6,363,170 B1 3/2002 Seitz et al.
2008/0192112 A1 8/2008 Hiramatsu et al.
(Continued)

FOREIGN PATENT DOCUMENTS

CN 107257430 A 10/2017
JP 2010020487 A 1/2010
(Continued)

OTHER PUBLICATIONS

Extended European Search Report issued by the European Patent Office dated Jul. 31, 2019 in corresponding European Patent Application No. 19170006.1.

(Continued)

*Primary Examiner* — Brenda C Bernardi
(74) *Attorney, Agent, or Firm* — Carter, DeLuca & Farrell LLP

(57) ABSTRACT

An image processing apparatus comprising: an image obtaining unit configured to obtain images based on capturing by a plurality of image capturing apparatuses; a position obtaining unit configured to obtain information representing a predetermined position to which the plurality of image capturing apparatuses are directed; a region setting unit configured to set, based on the information obtained by the position obtaining unit, a region to estimate a three-dimensional shape of an object; and an estimation unit configured to estimate, in the region set by the region setting unit, the three-dimensional shape of the object based on the images obtained by the image obtaining unit.

24 Claims, 5 Drawing Sheets

(51) Int. Cl.
*G06T 15/08* (2011.01)
*H04N 5/247* (2006.01)
(52) U.S. Cl.
CPC *G06T 2200/04* (2013.01); *G06T 2207/30221* (2013.01)

(56) References Cited

U.S. PATENT DOCUMENTS

| | | | |
|---|---|---|---|
| 2011/0025829 | A1 | 2/2011 | McNamer et al. |
| 2012/0327198 | A1 | 12/2012 | Tsukagoshi et al. |
| 2013/0002827 | A1 | 1/2013 | Lee et al. |
| 2016/0127692 | A1* | 5/2016 | Yoneji ............... G06K 9/00664 348/159 |
| 2016/0270656 | A1* | 9/2016 | Samec ................. A61B 3/022 |
| 2018/0098047 | A1 | 4/2018 | Itakura et al. |
| 2020/0322591 | A1* | 10/2020 | Yano ................... H04N 13/117 |

FOREIGN PATENT DOCUMENTS

| | | |
|---|---|---|
| JP | 2010134546 A | 6/2010 |
| JP | 2017102708 A | 6/2017 |
| JP | 2018049591 A | 3/2018 |
| RU | 2012135476 A | 2/2014 |
| WO | 0239716 A2 | 5/2002 |

OTHER PUBLICATIONS

Notification issued by the Federal Institute of Industrial Property of Russia dated Apr. 15, 2020 in corresponding RU Patent Application No. 2019112674, with English translation.

Chinese Office Action dated Sep. 1, 2020, for Corresponding Chinese Application No. 201910359400.4.

Kanade T., et al: "Virtualized Reality: Constructing Virtual Worlds from Real Scenes", IEEE Multimedia, IEEE Service Center, New York, NY US, vol. 4, No. 1, Jan. 1, 1997 (Jan. 1, 1997), pp. 34-47, XP000685698, ISSN: 1070-986X, DOI: 10.1109/93.580394.

European Office Action dated Dec. 3, 2020, for Corresponding European Application No. 19170006.1.

Notification of Reason for Refusal issued by the Korean Patent Office dated Jul. 28, 2021 in corresponding KR Patent Application No. 10-2019-0046449, with English translation.

* cited by examiner

IMAGE PROCESSING APPARATUS, CONTROL METHOD OF IMAGE PROCESSING APPARATUS, AND NON-TRANSITORY COMPUTER-READABLE STORAGE MEDIUM

BACKGROUND

Field

The present disclosure relates to an image processing apparatus, a control method of the image processing apparatus, and a non-transitory computer-readable storage medium and, more particularly, to a technique of generating a virtual viewpoint image based on images obtained by capturing an object from a plurality of directions and virtual viewpoint information.

Description of the Related Art

A technique of generating a virtual viewpoint image that enables viewing of a highlight scene of a soccer or basketball game from various angles has received attention. Japanese Patent Laid-Open No. 2010-134546 proposes a method of capturing an object from multiple viewpoints using a plurality of cameras installed at different positions and estimating the three-dimensional shape of the object using multi-viewpoint images obtained by the image capturing and a method of generating a virtual viewpoint image.

In a case in which a virtual viewpoint image is generated based on images captured by a plurality of cameras, a virtual viewpoint image including an object with a low shape accuracy is sometimes generated depending on the arrangement of the cameras and the object. For example, in a case of capturing a soccer game, when the positions to which the plurality of cameras are directed are set close to one goal, there are few cameras that include an object near the other goal in the angle of view. In this case, when the technique described in Japanese Patent Laid-Open No. 2010-134546 is used, the shape estimation accuracy of the object near the other goal lowers. If a virtual viewpoint image includes the object with the low shape accuracy, a viewer who views the virtual viewpoint image may be given an uncomfortable feeling.

The present disclosure has been made in consideration of the above-described problem, and provides a technique of reducing a risk of generating a virtual viewpoint image including an object with a low shape accuracy.

SUMMARY

According to one aspect of the present disclosure, there is provided an image processing apparatus comprising: an image obtaining unit configured to obtain images based on capturing by a plurality of image capturing apparatuses; a position obtaining unit configured to obtain information representing a predetermined position to which the plurality of image capturing apparatuses are directed; a region setting unit configured to set, based on the information obtained by the position obtaining unit, a region to estimate a three-dimensional shape of an object; and an estimation unit configured to estimate, in the region set by the region setting unit, the three-dimensional shape of the object based on the images obtained by the image obtaining unit.

According to one aspect of the present disclosure, there is provided a method of controlling an image processing apparatus, comprising: obtaining images based on capturing by a plurality of image capturing apparatuses; obtaining information representing a predetermined position to which the plurality of image capturing apparatuses are directed; setting, based on the obtained information, a region to estimate a three-dimensional shape of an object; and estimating, in the set region, the three-dimensional shape of the object based on the obtained images.

According to one aspect of the present disclosure, there is provided a non-transitory computer-readable storage medium storing a computer program for causing a computer to execute each step of a method of controlling an image processing apparatus, the method comprising: obtaining images based on capturing by a plurality of image capturing apparatuses; obtaining information representing a predetermined position to which the plurality of image capturing apparatuses are directed; setting, based on the obtained information, a region to estimate a three-dimensional shape of an object; and estimating, in the set region, the three-dimensional shape of the object based on the obtained images.

Further features will be apparent from the following description of exemplary embodiments with reference to the attached drawings.

DESCRIPTION OF THE EMBODIMENTS

An exemplary embodiment(s) of the present disclosure will now be described in detail with reference to the drawings. It should be noted that the relative arrangement of the components, the numerical expressions and numerical values set forth in these embodiments do not limit the scope of the present disclosure unless it is specifically stated otherwise.

In this embodiment, an example will be described, in which when generating a virtual viewpoint image from images obtained by image capturing of a plurality of image capturing apparatuses (cameras) directed to a predetermined position (gaze point), a region as the target of shape estimation is set, the three-dimensional shape of an object in the region is estimated, and a virtual viewpoint image including the object in the region is generated. More specifically, images obtained by capturing an image capturing target region including an object using a plurality of cameras are obtained. Information representing the position of a gaze point to which the plurality of cameras are directed is obtained. An object display region to display the object in a three-dimensional space is set based on the obtained information representing the position of the gaze point. A virtual viewpoint image in which the object included in the set object display region is displayed is generated based on the obtained images.

[System Arrangement]

Figure 1:
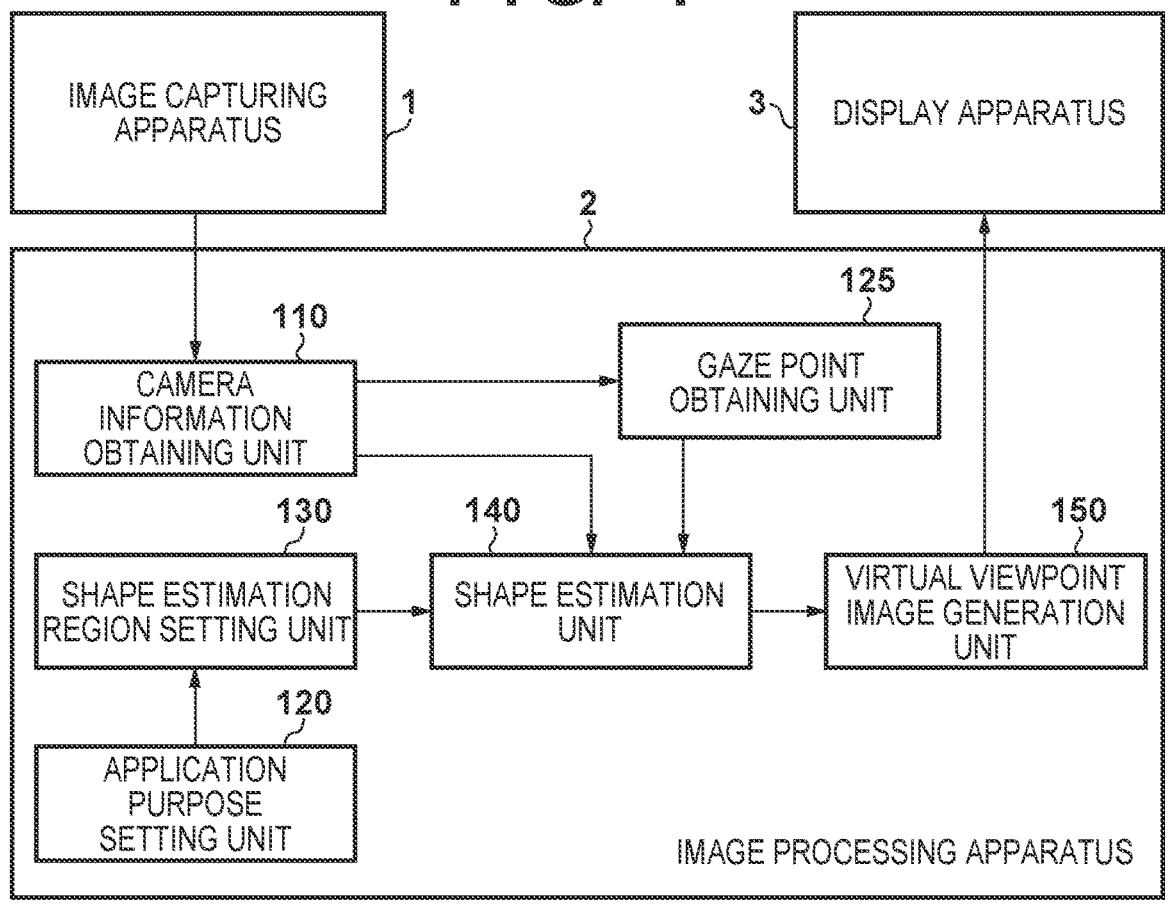
FIG. 1 is a block diagram showing an example of the arrangement of an image processing system according to an embodiment.

FIG. 1 is a block diagram showing an example of the arrangement of an image processing system according to this embodiment. The image processing system according to this embodiment includes an image capturing apparatus (camera) 1, an image processing apparatus 2, and a display apparatus 3. The camera 1 includes one or more cameras. The image processing apparatus 2 obtains images captured by the camera 1 and the parameters of each camera, and estimates the three-dimensional shape of an object. The image processing apparatus 2 then generates a virtual viewpoint image and transmits the image to the display apparatus 3. The display apparatus 3 outputs the received virtual viewpoint image to a display or the like.

[Functional Arrangement of Image Processing Apparatus]

As shown in FIG. 1, the image processing apparatus 2 includes a camera information obtaining unit 110, an application purpose setting unit 120, a gaze point obtaining unit 125, a shape estimation region setting unit 130, a shape estimation unit 140 and a virtual viewpoint image generation unit 150. The function of each processing unit is implemented when a CPU 1001 to be described later with reference to FIG. 7 executes a computer program read out from a ROM 1002 or a RAM 1003.

The camera information obtaining unit 110 obtains, from the camera 1, the camera information of each camera that forms the camera 1, and outputs the obtained camera information to the shape estimation unit 140. An image captured by each camera is also input to the shape estimation unit 140. The application purpose setting unit 120 sets application purpose information of a shape estimation result by a user operation using an input apparatus 1006 such as a keyboard to be described later, and outputs the set application purpose information to the shape estimation region setting unit 130. The gaze point obtaining unit 125 calculates and obtains the information of a gaze point representing a point to be gazed. The shape estimation region setting unit 130 sets shape estimation region information in accordance with the information of the gaze point and the application purpose information, and outputs the set shape estimation region information to the shape estimation unit 140.

The shape estimation unit 140 estimates the three-dimensional shape of an object in the shape estimation region, and outputs the information of the estimated three-dimensional shape (three-dimensional shape data) to the virtual viewpoint image generation unit 150. The virtual viewpoint image generation unit 150 generates a virtual viewpoint image using the information of a virtual viewpoint input by a user operation using the input apparatus 1006 such as a mouse, the camera information obtained by the camera information obtaining unit 110, and the information of the estimated three-dimensional shape. The generated virtual viewpoint image is then output to the display apparatus 3. The display apparatus 3 outputs the received virtual viewpoint image to the display screen of a display or the like.

[Hardware Arrangement of Image Processing Apparatus]

Figure 7:
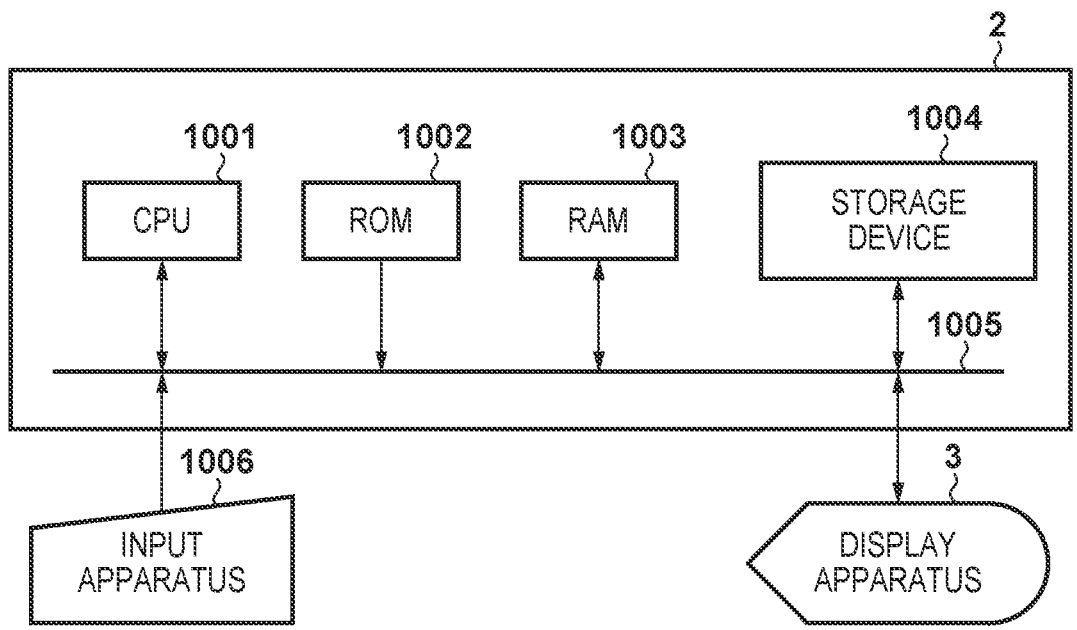
FIG. 7 is a block diagram showing an example of the hardware arrangement of the image processing apparatus according to an embodiment.

An example of the hardware arrangement of the image processing apparatus according to an embodiment of the present disclosure will be described here with reference to FIG. 7. The image processing apparatus 2 includes the CPU 1001, the ROM 1002, the RAM 1003, a storage device 1004, and a bus 1005, and is connected to the input apparatus 1006 and the display apparatus 3.

The CPU 1001 controls various kinds of operations by the above-described functional blocks of the image processing apparatus 2 according to this embodiment. The control contents are instructed by a program on the ROM 1002 or the RAM 1003 to be described later. In addition, the CPU 1001 can also operate a plurality of computer programs in parallel. The ROM 1002 stores data and computer programs that store the procedure of control by the CPU 1001. The RAM 1003 stores control programs to be processed by the CPU 1001, and also provides a work area for various data when the CPU 1001 executes various kinds of control. The functions of program codes stored in the recording medium such as the ROM 1002 or the RAM 1003 are read out and executed by the CPU 1001 and thus implemented. The type of the recording medium is not limited.

The storage device 1004 can store various data and the like. The storage device 1004 includes a recording medium such as a hard disk, a floppy disk, an optical disk, a magnetic disk, a magnetooptical disk, a magnetic tape, or a nonvolatile memory card, and a drive that drives the recording medium and records information. The stored computer programs and data are loaded into the RAM 1003 as needed in accordance with an instruction from a keyboard or the like or an instruction of various kinds of computer programs.

The bus 1005 is a data bus or the like connected to each constituent element, and implements communication between the constituent elements and also implements information exchange at a high speed. The input apparatus 1006 provides various kinds of input environments by the user. Although a keyboard, a mouse, and the like can be considered to provide various kinds of input operation environments, a touch panel, a stylus pen, or the like may also be used. The display apparatus 3 is formed by a liquid crystal display or the like, and displays, to the user, the states of various kinds of input operations and calculation results according to these. Note that the above-described arrangement is merely an example, and the arrangement is not limited to the described arrangement.

[Processing]

The procedure of processing executed by the image processing apparatus 2 according to this embodiment will be described next with reference to the flowchart of FIG. 2. In this flowchart, step S210 is a step of obtaining the camera information of each camera from the camera 1. Step S220 is a step of setting a region to estimate the shape of an object. Step S230 is a step of estimating the shape of an object in the set region. Step S240 is a step of generating a virtual viewpoint image using the shape estimation result, the camera information, and images. The detailed procedure will be described below.

<S210>

In step S210, the camera information obtaining unit 110 obtains, as camera information from the camera 1, images captured by the cameras and extrinsic parameters and intrinsic parameters as the camera information of the cameras. Here, the extrinsic parameters are the information of the position and orientation of the camera. The intrinsic parameters are the information of the focal length and the image center of the camera.

Figure 3:
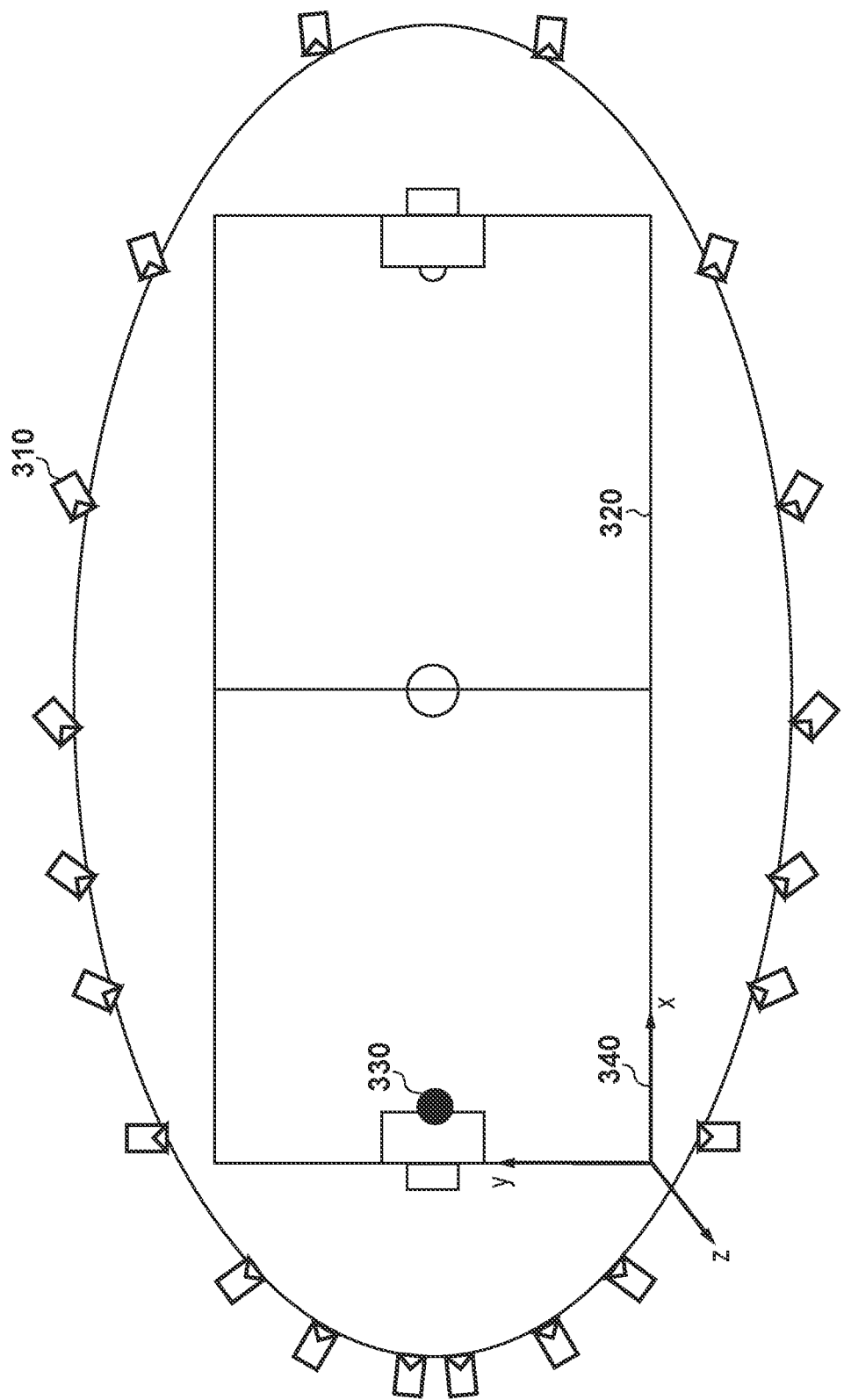
FIG. 3 is a schematic view showing an example of arranging a plurality of cameras according to an embodiment.

FIG. 3 shows an example of the arrangement of the camera 1 according to this embodiment. In this embodiment, a plurality of cameras 310 are arranged to surround a sports field 320. However, the image capturing target, the camera arrangement, and the number of cameras are not limited to these. The camera 1 is formed by one or more cameras 310, and each camera is set to observe a gaze point 330. Processing according to this embodiment needs at least one camera. However, the number of cameras does not have an upper limit. In addition, different gaze points and cameras configured to observe them may further be added. That is, the plurality of cameras 1 installed in the places of image capturing targets may include a camera group directed to a certain gaze point and a camera group directed to another gaze point.

In this embodiment, the x-axis of a world coordinate system 340 is parallel to the long side direction of the sports field 320, the y-axis is parallel to the short side direction, and the z-axis is vertical to the x-y plane. The actual size of the sports field 320 can be set by, for example, causing the user to manually input the length in the long side direction, the length in the short side direction, and the height in the vertical direction in advance using an input apparatus such as a mouse or a keyboard.

<S220>

Figure 4:
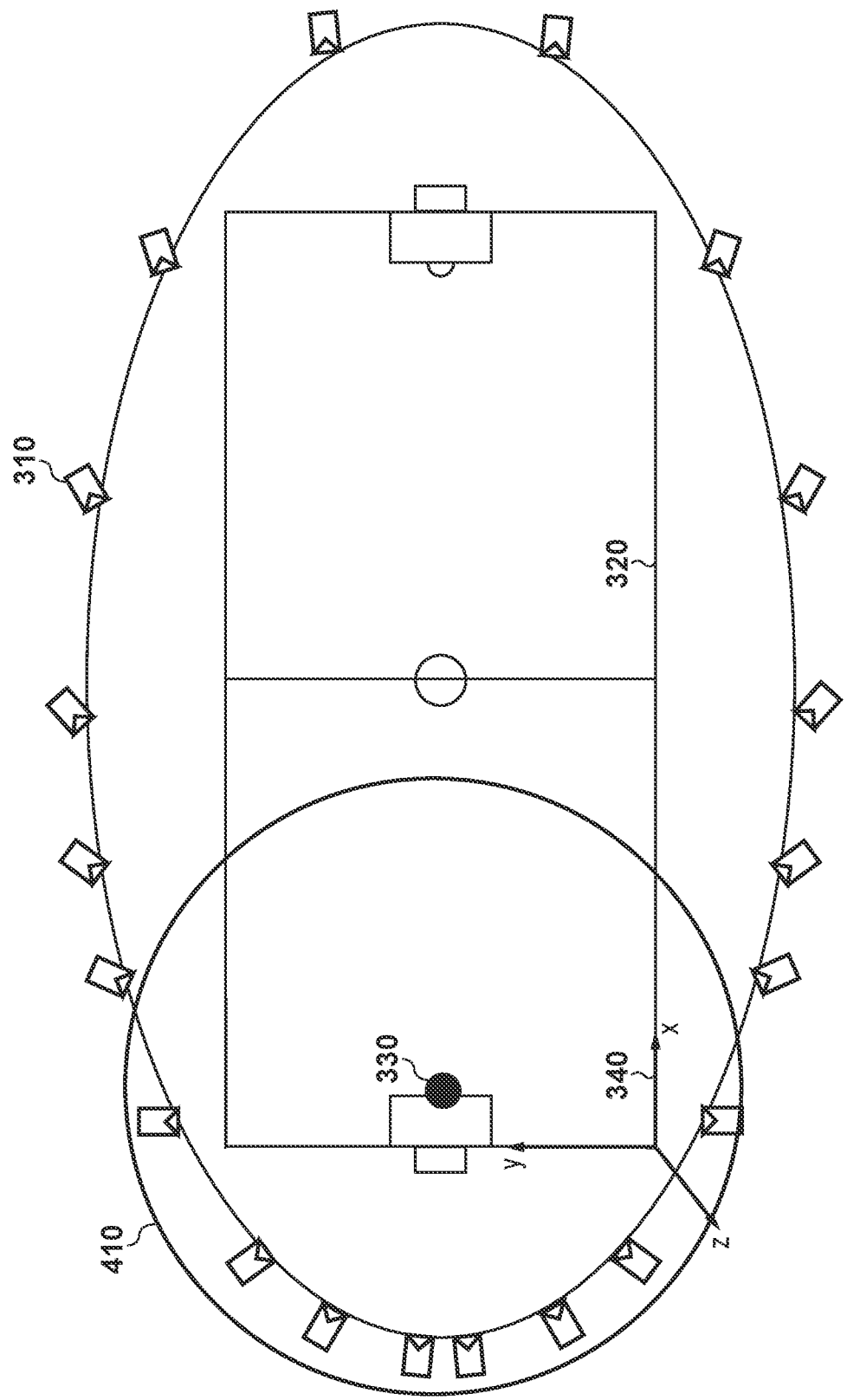
FIG. 4 is a schematic view showing an example of a shape estimation region according to an embodiment.

In step S220, the shape estimation region setting unit 130 sets a shape estimation region that is the target of estimation of the three-dimensional shape of an object. A shape estimation region 410 will be described below with reference to FIG. 4. The shape estimation region 410 is a three-dimensional region that is set based on the position of the gaze point 330 expressed by the world coordinate system 340 to estimate the three-dimensional shape of an object. For example, a predetermined distance range from the gaze point 330 is set as the shape estimation region 410. When the shape estimation region 410 is expressed by the distance from the gaze point 330, it has a semispherical shape divided on the x-y plane. In FIG. 4, however, the shape estimation region 410 is expressed two-dimensionally. The gaze point is a position to which each of the plurality of cameras is directed. The focusing position of at least one of the plurality of cameras may be set based on the gaze point. For example, the focusing position of the camera may be set at the position of the gaze point, or may be set at a position apart from the position of the gaze point by a predetermined distance. In addition, the optical axes of the cameras may cross at the position of the gaze point, or may not cross.

Note that the shape is not limited to this. For example, two vertices on a diagonal of a rectangular parallelepiped may be input to set the shape estimation region as a space having a rectangular parallelepiped shape with respect to the position of the gaze point 330 as the center. In addition, the shape is not limited to the example with respect to the position of the gaze point 330 as the center, and the shape estimation region may be set as a space having a rectangular parallelepiped shape surrounding the position of the gaze point 330. Alternatively, white lines in the sports field and the intersections of the lines may be detected using an image processing method such as Hough transformation for detecting a line, and the bottom surface of a shape estimation region having a rectangular parallelepiped shape may be set. In this case, the height information of the shape estimation region may arbitrarily be set by the user based on the sport as the target of virtual viewpoint image generation. In the shape estimation processing of step S230 to be described later, the shape of an object in the shape estimation region 410 is estimated. If a plurality of gaze points exist, a shape estimation region is set for each gaze point.

Figure 5:
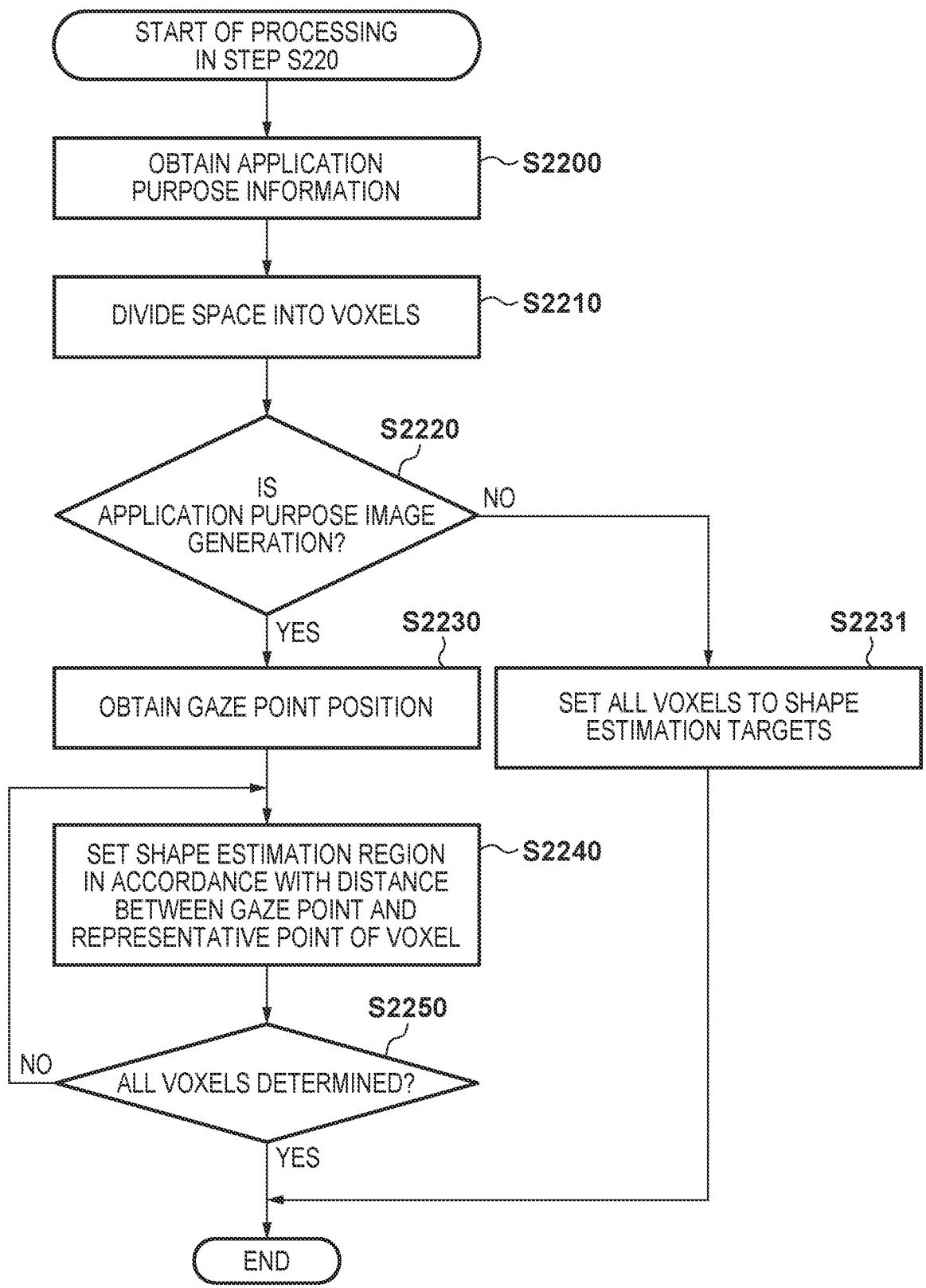
FIG. 5 is a flowchart showing the detailed procedure of processing in step S220 according to an embodiment.

The processing of setting the shape estimation region in step S220 will be described here in detail with reference to the flowchart of FIG. 5. Note that the shape estimation region setting processing to be explained here is processing in a case in which a shape estimation region with respect to the gaze point 330 as the center is set, and the following setting processing is appropriately changed in accordance with the shape of the shape estimation region to be set, or the like. Additionally, in a case in which the user designates a shape estimation region, the shape estimation region setting unit 130 sets the shape estimation region based on information input by a user operation.

<S2200>

In step S2200, the application purpose setting unit 120 obtains application purpose information input by the user. The application purpose is, for example, virtual viewpoint image generation or player motion analysis.

<S2210>

In step S2210, the shape estimation region setting unit 130 divides the three-dimensional space into a plurality of voxels. At this time, in a case in which the application purpose represented by the application purpose information set by the application purpose setting unit 120 is virtual viewpoint image generation, the voxels are each set to a small size such that an object can be displayed at a high resolution. On the other hand, if the application purpose is player motion analysis, the voxels are set coarsely to such an extent that the position of an object can be estimated. That is, the size of the voxels that form the three-dimensional space and are used to estimate the three-dimensional shape of an object is changed in accordance with the application purpose. In a case in which the application purpose is generation of a virtual viewpoint image, the voxels that form the space are set finely, as compared to another application purpose (for example, motion analysis).

<S2220>

In step S2220, the shape estimation region setting unit 130 determines whether the application purpose represented by the application purpose information set by the application purpose setting unit 120 is virtual viewpoint image generation or not. If the application purpose is virtual viewpoint image generation (YES in step S2220), the process advances to step S2230. On the other hand, if the application purpose is not virtual viewpoint image generation but, for example, player motion analysis (NO in step S2220), the process advances to step S2231.

<S2230>

In step S2230, the gaze point obtaining unit 125 obtains the information of the position (coordinates) of the gaze point 330 to set voxels as the target of shape estimation. The coordinates of the gaze point 330 are expressed by the world coordinate system 340 and are assumed to be located on the plane (z=0) of the sports field 320. The coordinates of the gaze point are obtained by calculating the intersection of the plane of z=0 and the sight line vector of a camera, which can be calculated from the extrinsic parameter of a camera included in the cameras 1. If there exist a plurality of gaze points, the coordinates of each gaze point can be estimated by the same method in a camera that constructs the cameras that observe the gaze points.

<S2240>

Next, in step S2240, based on the position (coordinates) of the gaze point 330 obtained in step S2230, the shape estimation region setting unit 130 sets a region (shape estimation region) to estimate the shape of an object. More specifically, all voxels are scanned, and a three-dimensional distance 630 between the gaze point 330 and the representative point of each voxel (for example, the center point of each voxel) is calculated. Then, the three-dimensional distance is compared with a threshold set in advance. If the three-dimensional distance is equal to or less than the threshold, the voxel value is set to 1 as the shape estimation region. When a plurality of gaze points exist, an ID is set for each gaze point, and the distance between each voxel and each gaze point is calculated. If the distance to the closest gaze point is equal to or less than a threshold, the ID of the gaze point is set to the voxel value.

<S2250>

In step S2250, the shape estimation region setting unit 130 determines whether the determination of the shape estimation region is completed for all voxels or not. If the determination is completed, the shape estimation region setting processing is ended, and the process advances to step S230 in FIG. 2. On the other hand, if an undetermined voxel remains, the process returns to step S2240.

Figure 6:
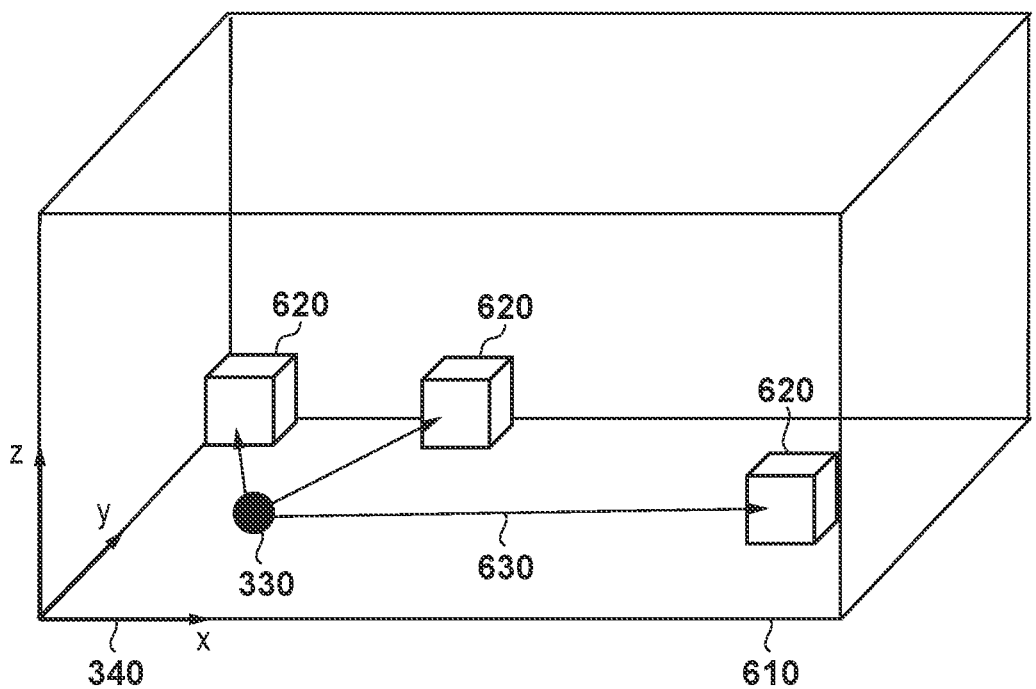
FIG. 6 is a schematic view concerning a shape estimation region setting method according to an embodiment.

As shown in FIG. 6, a three-dimensional space 610 defined by the input size of the sports field 320 is filled with voxels 620 having an uniform size (resolution), and each voxel value is set to 0. In this embodiment, 0 is set for the outside of the shape estimation region, 1 is set for the shape estimation region of a first gaze point, and 2 is set for the shape estimation region of a second gaze point. In accordance with the number of gaze points, the voxel values are set such that the shape estimation region of each gaze point can be identified. The size of each voxel in the physical world is set by the user in advance, like the size of the sports field.

<S2231>

Figure 2:
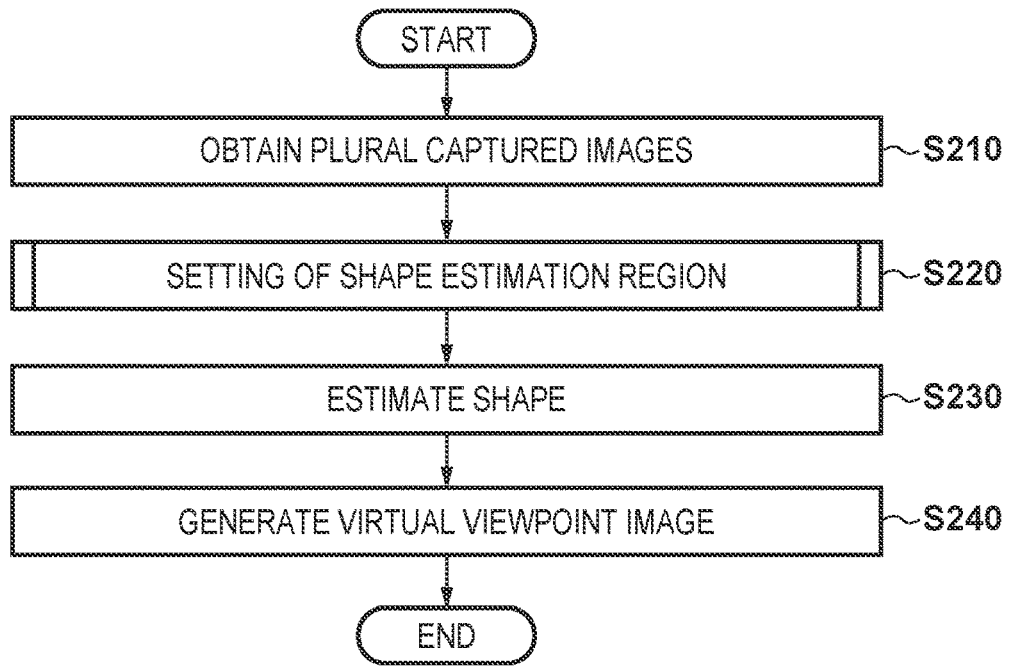
FIG. 2 is a flowchart showing the procedure of processing executed by an image processing apparatus according to an embodiment.

In step S2231, to set all the voxels set in step S2210 to the shape estimation targets, the shape estimation region setting unit 130 sets the values of all the voxels to 1, ends the shape estimation region setting processing, and advances to step S230 in FIG. 2.

<S230>

The process returns to step S230 in FIG. 2. In step S230, the shape estimation unit 140 estimates the three-dimensional shape of an object in the shape estimation region set by the shape estimation region setting unit 130. The shape estimation processing by the shape estimation unit 140 will be described below.

First, a silhouette image of the object is generated for an image obtained by the camera information obtaining unit 110. The silhouette image can be generated by a general method such as a background difference method of calculating the difference from the background image from a captured image obtained by capturing the object and defining a pixel equal to or more than a threshold as a silhouette (foreground region). In this embodiment, pixel values in the foreground region are 1, and a pixel values in the background region are 0.

Next, the shape information of the object is estimated using the silhouette image and the camera information. To estimate the three-dimensional shape, each voxel set as the shape estimation region in step S220 is converted into the image coordinates of each camera using the camera parameter of each camera. The number of cameras for which the pixel values in the silhouette image on the coordinates after the conversion are 1 is counted. If the number is equal to or more than a set value, the voxel is determined as the shape of the object. This determination is executed for all the voxels in the shape estimation region, thereby estimating the three-dimensional shape of the object in the shape estimation region. As a result of this processing, volume data that expresses the three-dimensional shape of the object is obtained.

Note that in a case in which a plurality of gaze points exist, first, the information of a camera that observes the gaze point is obtained based on the ID of the gaze point set in each voxel value. Then, the coordinates of each voxel are converted into the image coordinates of each camera included in the camera, and the number of visible cameras is counted. If the number of cameras is equal to or more than a set threshold, the voxel is determined as the shape of the object. When this processing is repeated for all voxels in a similar manner, the three-dimensional shape of the object can be estimated based on the shape estimation region even in a case in which a plurality of gaze points are set.

<S240>

In step S240, the virtual viewpoint image generation unit 150 performs processing of coloring the shape information (three-dimensional voxel set) estimated in step S230 and projecting the shape information onto the image plane of a virtual viewpoint to generate the foreground image of the object region. The virtual viewpoint image generation unit 150 further executes processing of generating the background image from the virtual viewpoint. The foreground image is superimposed on the generated background image, thereby generating a virtual viewpoint image. The generated virtual viewpoint image is transmitted to the display apparatus 3. Note that the virtual viewpoint may be designated by the user or automatically designated by the apparatus.

Note that when performing motion analysis, not the generation of a virtual viewpoint image but motion analysis is performed in step S240.

[Generation of Foreground Image]

First, to generate the foreground image of the virtual viewpoint image, the colors of the voxels that form the three-dimensional shape of the object estimated in step S230 are calculated using the images of the cameras used for the image capturing. First, from which camera each voxel is viewed is determined. At this time, in a case in which a plurality of gaze points are set, in the cameras forming the cameras that observe a gaze point, which camera views a gaze point is determined based on the ID of the gaze point set as the voxel value. A camera close to the virtual viewpoint is selected from the cameras that view the voxel, and the voxel is projected on the nearest camera.

The color of a pixel closest to the projected voxel is obtained and set as the color of the voxel. The voxels can be colored by repeating the processing for each voxel. The colored voxels are rendered by a known CG rendering method, thereby generating a foreground image in which the object in the shape estimation region 410 set in step S230 is displayed.

Note that when the three-dimensional shape of the object is estimated using all the voxels set in step S2210 as the processing targets, and using the result, rendering is performed while determining whether each voxel is located in the shape estimation region or not, the foreground image of the virtual viewpoint image can similarly be generated. That is, although the three-dimensional shape of the object is estimated using all the voxels as the targets, the targets of rendering and display may be limited to voxels in the set display target region. This determination can be performed by calculating the distance between the gaze point 330 and the representative point of each voxel that forms the three-dimensional shape of the object. In addition, it may be determined whether the whole or a part (for example, the center of gravity) of the three-dimensional shape of a certain object is included in the set region. If included, the whole of the three-dimensional shape of the object is set to the display target. Otherwise, the whole of the three-dimensional shape of the object may be excluded from the display target.

A virtual viewpoint image of the entire sports field may be generated by executing coloring processing not only in the shape estimation region 410 but also for the voxels outside the shape estimation region.

Additionally, the shape estimation unit 140 may further estimate the three-dimensional shape of an object outside the shape estimation region at a resolution lower than that of the three-dimensional shape of an object in the shape estimation region. That is, while setting objects in all regions including the outside of the shape estimation region to three-dimensional shape estimation candidates, the estimation of the three-dimensional shape of an object in the shape estimation region may preferentially be performed. Then, the virtual viewpoint image generation unit 150 may generate a virtual viewpoint image based on the three-dimensional shape of an object in the shape estimation region and the estimated three-dimensional shape of an object outside the shape estimation region. For example, the size (resolution) of a voxel or how to thin the voxels to be colored may be changed between the inside of the shape estimation region and the outside of the shape estimation region. More specifically, coloring processing is executed for all voxels in the shape estimation region. As for voxels outside the shape estimation region, coloring processing is executed by, for example, regarding eight adjacent voxels as one voxel. This can shorten the generation time of the virtual viewpoint image. Furthermore, in this case, an effect of blurring a distorted object image outside the shape estimation region and making it unnoticeable can be obtained. In addition, the entire region of the image capturing target may be divided into a shape estimation region in which shape estimation is preferentially performed, a region of a shape estimation candidate that becomes the target of shape estimation when the system processing load or processing time is not so much, and a non-shape estimation region that does not becomes the target of shape estimation.

[Generation of Background Image]

Next, the background image of the virtual viewpoint image is generated. First, in a background 3D model (the three-dimensional shape data of the background), the vertices of the four corners of the sports field are obtained. As the background 3D model, a CG model created in advance and saved in the system is used. The four vertices are projected to two cameras (to be referred to as camera 1 and camera 2) close to the virtual viewpoint and the camera coordinate system of the virtual viewpoint. Projection matrix 1 between the virtual viewpoint and camera 1 and projection matrix 2 between the virtual viewpoint and camera 2 are calculated using the corresponding points between the virtual viewpoint and camera 1 and between the virtual viewpoint and camera 2. To calculate each pixel value of the background image of the virtual viewpoint, the coordinates of each pixel value are projected to the background images using projection matrix 1 and projection matrix 2, and the pixel values of the points are obtained. The average of two obtained pixel values is calculated and used as a pixel value of the background image.

The generated foreground image is superimposed on the thus obtained background image of the virtual viewpoint image, thereby generating the virtual viewpoint image. That is, the generated virtual viewpoint image is an image in which the foreground image of the object in the shape estimation region is composited with the background image of the entire image capturing target region. However, the range of the background image to be generated may also be limited to the shape estimation region. In addition, the method of generating the virtual viewpoint image is not limited to this method, and another method may be used.

As described above, according to this embodiment, the region of three-dimensional shape estimation of an object can be limited based on the position of the gaze point. The three-dimensional shape of the object in the limited shape estimation region is estimated, and the virtual viewpoint image is generated, thereby preventing the distorted object image from being displayed. In addition, since the distorted object shape is not included in the foreground image generation processing with a heavy load, an effect of reducing the processing load can be obtained.

When the shape estimation region is switched for each application purpose in step S2220, an image or the three-dimensional shape of an object suitable for the purpose can be generated.

Note that in this embodiment, an image or camera information is obtained from the camera 1. However, the present disclosure is not limited to this, and an image or camera information may temporarily be stored in the storage device and processed. In this embodiment, an image is output to the display apparatus 3 and displayed. However, the present disclosure is not limited to this, and, for example, an image may be saved by connecting a storage device or may be printed as a still image by connecting a printer. In addition, setting of the shape estimation region is not limited to this, and may be done by causing the user (not shown) to arbitrary generate the shape of the bottom surface or the three-dimensional shape. Note that the gaze point can also be set other than on the plane. For example, in a sport such as rings, a gaze point may be set in the air.

Note that in this embodiment, an example in which the shape estimation region is switched for each application purpose has been described. However, the application purpose setting unit 120 may be omitted, and a fixed shape estimation region may be used. For example, the application purpose may be limited to "virtual viewpoint image generation", and the position, shape, and the like of the shape estimation region may be fixed. This can be implemented by, for example, recording these pieces of information in a nonvolatile memory of the shape estimation region setting unit 130 or the like.

According to the present disclosure, it is possible to reduce a risk of generating a virtual viewpoint image including an object with a low shape accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-089465, filed May 7, 2018, which is hereby incorporated by reference wherein in its entirety.

What is claimed is:

1. An image processing apparatus comprising:
one or more memories storing instructions; and
one or more processors executing the instructions to:
obtain images based on capturing by a plurality of image capturing apparatuses;
obtain information representing a predetermined position to which the plurality of image capturing apparatuses are directed;
set, based on the obtained information, a region for generating three-dimensional shape data representing a three-dimensional shape of an object, wherein the set region is a part of a region captured by the plurality of image capturing apparatuses, and wherein a size of the set region and a size of each of elements forming a three-dimensional space corresponding to the set region depend on an application purpose of three-dimensional shape data to be generated using some of the elements; and
generate, based on the obtained images, the three-dimensional shape data of the object in the set region,
wherein a size of a set region for a first application purpose is smaller than a size of a set region for a second application purpose and a size of an element forming a three-dimensional space corresponding to the set region for the first application purpose is smaller than a size of an element forming a three-dimensional space corresponding to the set region for the second application purpose.

2. The apparatus according to claim 1, wherein the set region is a predetermined distance range from the predetermined position.

3. The apparatus according to claim 1, wherein the set region is a space having a rectangular parallelpiped shape with respect to the predetermined position as a center.

4. The apparatus according to claim 1, wherein the set region in a case in which a plurality of predetermined positions exist, is set for each predetermined position.

5. The apparatus according to claim 1, wherein the one or more processors further execute the instructions to obtain application purpose information for specifying application purpose of the three-dimensional shape data.

6. The apparatus according to claim 5, wherein the application purpose which is not the generation of the image based on a designated virtual viewpoint is motion analysis.

7. The apparatus according to claim 1, wherein in a case where an application purpose is generation of a virtual viewpoint image based on a designated virtual viewpoint, a size is set smaller than that in a case where the application purpose is not the generation of the virtual viewpoint image.

8. The apparatus according to claim 1, wherein in accordance with the application purpose, a size of a voxel that forms a three-dimensional space and is used to generate the three-dimensional shape data of the object is changed.

9. The apparatus according to claim 8, wherein in a case in which an application purpose is generation of a virtual viewpoint image based on a designated virtual viewpoint, the size of the voxel is set to a size smaller than that in a case in which the application purpose is not the generation of the virtual viewpoint image.

10. The apparatus according to claim 1, wherein three-dimensional shape data of an object outside the set region is generated at a resolution lower than a resolution of the three-dimensional shape data of the object in the set region.

11. The apparatus according to claim 10, wherein the one or more processors further execute the instructions to generate a virtual viewpoint image based on a designated virtual viewpoint based on the generated three-dimensional shape data,
wherein the virtual viewpoint image is generated based on the generated three-dimensional shape data of the object in the set region.

12. The apparatus according to claim 1, wherein the one or more processors further execute the instructions to generate a virtual viewpoint image based on a designated virtual viewpoint and based on the generated three-dimensional shape data.

13. The apparatus according to claim 1, wherein the first application purpose is generation of a virtual viewpoint image based on a designated virtual viewpoint and the second application purpose is not the generation of the virtual viewpoint image.

14. A method of controlling an image processing apparatus, comprising:
obtaining images based on capturing by a plurality of image capturing apparatuses;
obtaining information representing a predetermined position to which the plurality of image capturing apparatuses are directed;
setting, based on the obtained information, a region for generating three-dimensional shape data representing a three-dimensional shape of an object, wherein the set region is a part of a region captured by the plurality of image capturing apparatuses, and wherein a size of the set region and a size of each of elements forming a three-dimensional space corresponding to the set region depend on an application purpose of three-dimensional shape data to be generated using some of the elements; and
generating, based on the obtained images, three-dimensional shape data of the object in the set region,
wherein a size of a set region for a first application purpose is smaller than a size of a set region for a second application purpose and a size of an element forming a three-dimensional space corresponding to the set region for the first application purpose is smaller than a size of an element forming a three-dimensional space corresponding to the set region for the second application purpose.

15. A non-transitory computer-readable storage medium storing a computer program for causing a computer to execute each step of a method of controlling an image processing apparatus, the method comprising:
obtaining images based on capturing by a plurality of image capturing apparatuses;

obtaining information representing a predetermined position to which the plurality of image capturing apparatuses are directed;

setting, based on the obtained information, a region for generating three-dimensional shape data representing a three-dimensional shape of an object, wherein the set region is a part of a region captured by the plurality of image capturing apparatuses, and wherein a size of the set region and a size of each of elements forming a three-dimensional space corresponding to the set region depend on an application purpose of three-dimensional shape data to be generated using some of the elements; and generating, based on the obtained images, three-dimensional shape data of the object in the set region, wherein a size of a set region for a first application purpose is smaller than a size of a set region for a second application purpose and a size of an element forming a three-dimensional space corresponding to the set region for the first application purpose is smaller than a size of an element forming a three-dimensional space corresponding to the set region for the second application purpose.

16. An image processing apparatus comprising:
one or more memories storing instructions; and
one or more processors executing the instructions to:
obtain images based on capturing by a plurality of image capturing apparatuses; and
generate, based on the obtained images, three-dimensional shape data of an object in a set region a size of a set region for a first application purpose being smaller than a size of a set region for a second application purpose and a size of an element forming a three-dimensional space corresponding to the set region for the first application purpose being smaller than a size of an element forming a three-dimensional space corresponding to the set region for the second application purpose.

17. The apparatus according to claim 16, wherein the one or more processors further execute the instructions to obtain application purpose information for specifying application purpose of the three-dimensional shape data.

18. The apparatus according to claim 16, wherein the first application purpose is generation of a virtual viewpoint image based on a designated virtual viewpoint and the second application purpose is not the generation of the virtual viewpoint image.

19. The apparatus according to claim 18, wherein the application purpose which is not the generation of the image based on a designated virtual viewpoint is motion analysis.

20. The apparatus according to claim 16, wherein the element is a voxel.

21. The apparatus according to claim 16, wherein three-dimensional shape data of an object outside the set region is generated at a resolution lower than a resolution of the three-dimensional shape data of the object in the set region.

22. The apparatus according to claim 16, wherein the one or more processors further execute the instructions to generate a virtual viewpoint image based on a designated virtual viewpoint based on the generated three-dimensional shape data.

23. A method of controlling an image processing apparatus, comprising:
obtaining images based on capturing by a plurality of image capturing apparatuses; and generating, based on the obtained images, three-dimensional shape data of an object in a set region, a size of a set region for a first application purpose being smaller than a size of a set region for a second application purpose and a size of an element forming a three-dimensional space corresponding to the set region for the first application purpose being smaller than a size of an element forming a three-dimensional space corresponding to the set region for the second application purpose.

24. A non-transitory computer-readable storage medium storing a computer program for causing a computer to execute each step of a method of controlling an image processing apparatus, the method comprising:
obtaining images based on capturing by a plurality of image capturing apparatuses; and
generating, based on the obtained images, three-dimensional shape data of an object in a set region, a size of a set region for a first application purpose being smaller than a size of a set region for a second application purpose and a size of an element forming a three-dimensional space corresponding to the set region for the first application purpose being smaller than a size of an element forming a three-dimensional space corresponding to the set region for the second application purpose.

* * * * *